United States Patent [19]
Ohishi et al.

[11] Patent Number: 5,884,034
[45] Date of Patent: Mar. 16, 1999

[54] APPARATUS OF ARTICLE DISTRIBUTION END CONTROL

[75] Inventors: Kazuhiro Ohishi; Takahiro Kii; Kyoko Okuyama, all of Kawasaki, Japan

[73] Assignee: Fujitsu Ltd., Kawasaki, Japan

[21] Appl. No.: 756,337

[22] Filed: Nov. 26, 1996

[30] Foreign Application Priority Data

Jun. 28, 1996 [JP] Japan .................................. 8-170502

[51] Int. Cl.$^6$ .................................................. G06F 13/00
[52] U.S. Cl. .............................. 395/200.36; 395/200.37; 395/200.75; 370/475
[58] Field of Search ........................ 395/200.34, 200.37, 395/200.36, 200.75, 603, 604, 605, 606; 370/389, 392, 475; 463/22; 379/280

[56] References Cited

U.S. PATENT DOCUMENTS

5,555,426  9/1996  Johnson .............................. 395/200.15
5,564,018 10/1996  Flores ................................ 395/200.02

*Primary Examiner*—Glenton B. Burgess
*Assistant Examiner*—Stephanie D. Hicks
*Attorney, Agent, or Firm*—Staas & Halsey

[57] ABSTRACT

An apparatus for controlling article distribution end which provides vague communication manners to casually distribute an article to unspecified readers with no designation of distribution and addresses from a user, even if there is no designation of distribution end address by the user, and also provides flexible communication manners to induce a formation of communication between users in such a way as to surprise a reader to whom an article is distributed that the article is distributed accidentally as well as to allow the reader to reply casually and almost anonymously because the users do not known each other, and further provides the flexible communication manners to give a joy to a distributor that he has received a reply to the article distributed to an unspecified distribution end even if the reply is a casual one such as impression or the like, by automatically obtaining a random distribution end address to which the user is irrelevant in selection, from data base of distribution end addresses.

17 Claims, 9 Drawing Sheets

| ADDRESS | 223264 |
|---------|--------|
| NAME | TANAKA |
| AGE | 32 |
| PLACE | TOKYO |
| FORUM | TENNIS FORUM |

| ID | CALCULATION RULE | CALCULATION PROCEDURES |
|---|---|---|
| R1 | ADDRESS | {adi}=func() |
| R2 | AGE | {adi}=func(20) |
| R3 | PLACE | {adi}=func(Hyogo Pref) |
| R4 | FORUM | {adi}=func("go"forum) |
| R5 | NUMBER | {adi}=func(1000persons) |
| R6 | DISTRIBUTION TIME | {adi}=func(from 10 to 12) |

FIG. 8

| ID | CALCULATION RULE | CALCULATION PROCEDURES |
|---|---|---|
| R1 | ADDRESS | {ad1,adi,···adn} |
| R2 | AGE | {ad1,adi,···adn} |
| R3 | PLACE | {ad1,adi,···adn} |
| R4 | FORUM | {ad1,adi,···adn} |
| R5 | NUMBER | {ad1,adi,···adn} |
| R6 | DISTRIBUTION TIME | {ad1(time 1),adi(time i),···,adn(time n)} |

FIG. 9

APPARATUS OF ARTICLE DISTRIBUTION END CONTROL

BACKGROUND OF THE INVENTION

1. Field of the Invention

The present invention relates to an apparatus for controlling an article distribution end which automatically obtains a random distribution end address to which a user is irrelevant in selection, from data base of article distribution end addresses even if there is no addressing of article distribution end by a user.

2. Description of the Related Art

In such network environment as the Internet, personal computer communication or the like, if, for example, an article is distributed to a companion user of a personal computer by an electronic mail, a system operator at a host station of personal computer communication service which has a function of electronic bulletin board for exchanging messages with many unspecified users, can transmit a mail to all of the members. However, a general user must designate a mail address of a companion. At this time, the user writes an article in consideration of a character of a person at article distribution end, his relation with the user and so forth.

As communication means for opening one's opinion and question to the public, and for offering information to many unspecified users of personal computers, such personal computer communication services as electronic bulletin board, forum and so on are provided. In such services, users cannot communicate with each other until a user of a personal computer accesses to the published opinion, question or offered information.

If a user, who is a sender, more positively demands communication to be formed by the impression of the opinion, the answer to the question, the opinion and impression to the information, not waiting someone's access to the published opinion, question, the offered information and the like on the electronic bulletin board or on the forum, the communication is more probably formed when the opinion, question, information and so on are distributed to another user of a personal computer.

But, if the address of the other user is unknown, to whom the opinion, question, information and so on are wanted to be distributed, or if some response even merely impression is wanted when the opinion, impression, information and the like are casually informed to a companion user whose address is unknown, it is impossible to casually send the opinion, question, information and so on to an unspecified user, since the article cannot be distributed to the companion user as far as the user does not designate the article distribution end address in the conventional network environment.

Besides, in the conventional network environment, if a user to whom an article is distributed is requested to give one's opinion, impression and so on to the article, the user finds if difficult to reply causally or vaguely in such a manner that "I receive dthe article", "I had a pleasant time" and so on because the user is designated by the sender.

As mentioned above, in the conventional network environment, since a user must designate an article distribution end address, such vague and casual communication manners cannot be realized as to send an opinion, question, information and so on to an unspecified companion user, so that communication system lacks flexibility.

SUMMARY OF THE INVENTION

The present invention has been devised to solve such problems as above-mentioned. An object of the invention is to provide an apparatus for controlling an article distribution end which provides vague communication manners to casually distribute an article to unspecified readers with no designation of distribution end addresses from a user, and also provides flexible communication manners to induce a formation of communication between users in such a way as to surprise a user to whom an article is distributed accidentally as well as to allow the render to replay casually and almost anonymously because the users do not know each other, and further provides flexible communication manners to give a joy to a distributor that he has received a replay to the article distributed to an unspecified article distribution even if the reply is a casual one such as an impression, by obtaining an unspecified article distribution end address to which the user is irrelevant in selection, from data base of article distribution end addresses by, for example, generating a random number.

The apparatus for controlling an article distribution end of the present invention stores such attributes as an address, name, age, place, forum one belongs to and the like of each article distribution end. In order to gain an unspecified distributed selectively, from among article distribution ends whose addresses are stored, by generating, for example, a random number. On the basis of the random number, a pointer and the like for designating the position in which the article distribution end address being stored is calculated. Further, on the basis of the pointer, the article distribution end address to which information is to be distributed by retrieving the stored attributes.

The apparatus for controlling an article distribution end of the invention stores plural kinds of calculation rules for restricting the range of selection of an article distribution end with an address to be obtained, that is, for example, plural kinds of retrieval conditions such as a user above 00 years old, a resident in 00 city, a user belonging to 00 forum and so on. The apparatus accepts designation of the kind of calculation rule by the user, then calculates a pointer and the like for designating the position in which article distribution end address is stored from among article distribution ends within the range of selection restricted by the designated calculation rule on the basis of a random number and the like.

The above and further objects and features of the invention will more fully be apparent from the following detailed description with accompanying drawings.

DESCRIPTION OF THE PREFERRED EMBODIMENTS (Embodiment 1)

Figure 1:
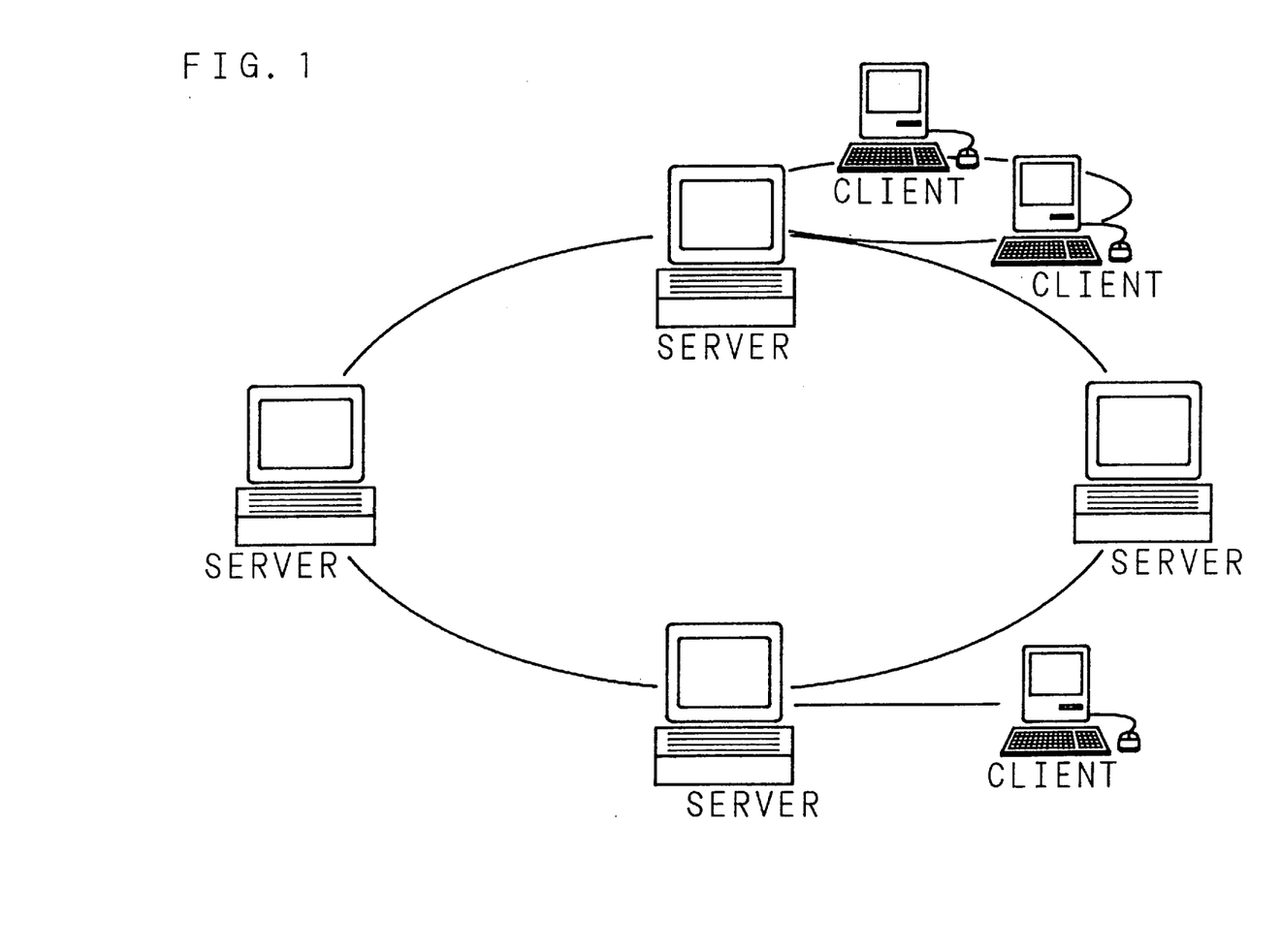
FIG. 1 is a schematic diagram of a first embodiment of the invention.

FIG. 1 is a schematic diagram showing a configuration of a distributed network (the Internet and the like) which employs the apparatus of article distribution end control of the invention.

In the distributed network, one network such as LAN in which a plurality of personal computers receiving services from a server as clients are connected to the server, is connected with other networks through communication lines.

In such distributed network, since there is no system for controlling the whole network, the apparatus of the invention is built in the client personal computer.

Figure 2:
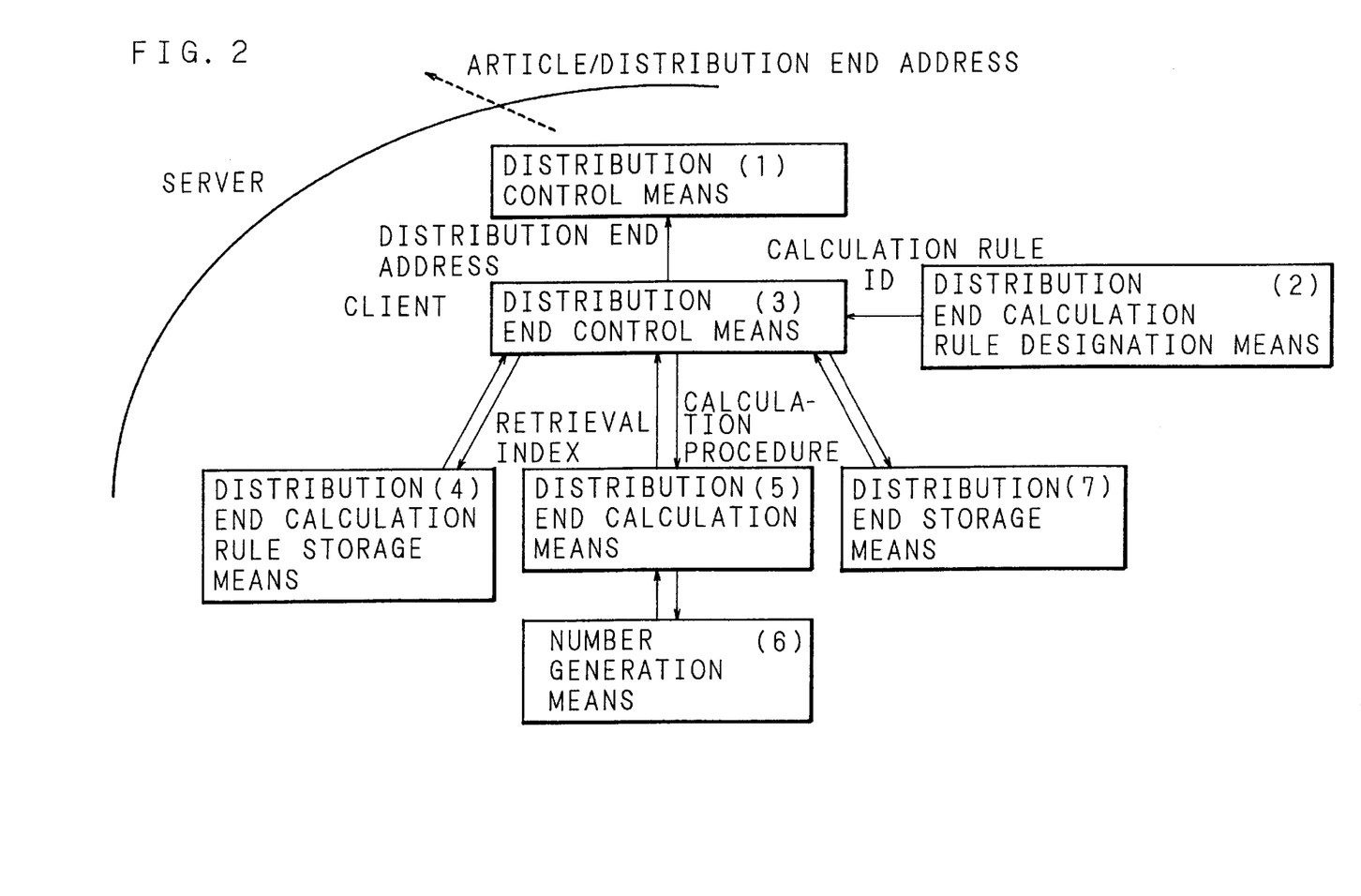
FIG. 2 is a functional block diagram of a first embodiment of the invention.

FIG. 2 is a functional block diagram showing the functional arrangement of the apparatus for controlling an article distribution end in the distributed network.

Distribution end calculation rule designation means 2 accepts designation of a calculation rule of a distribution end by a user at the client personal computer and gives the designated rule to distribution end control means 3, according to a click of an icon which is the symbol of a retrieval condition for restricting the range of selecting a distribution end, such as, for example, a user above 00 years old, a resident in 00 city, a user belonging to 00 community and the like, or according to the input ID, as will be described later, appended to each of the calculation rules for calculating distribution ends which are retrieval conditions for narrowing the range of selecting distribution ends.

Figure 7:
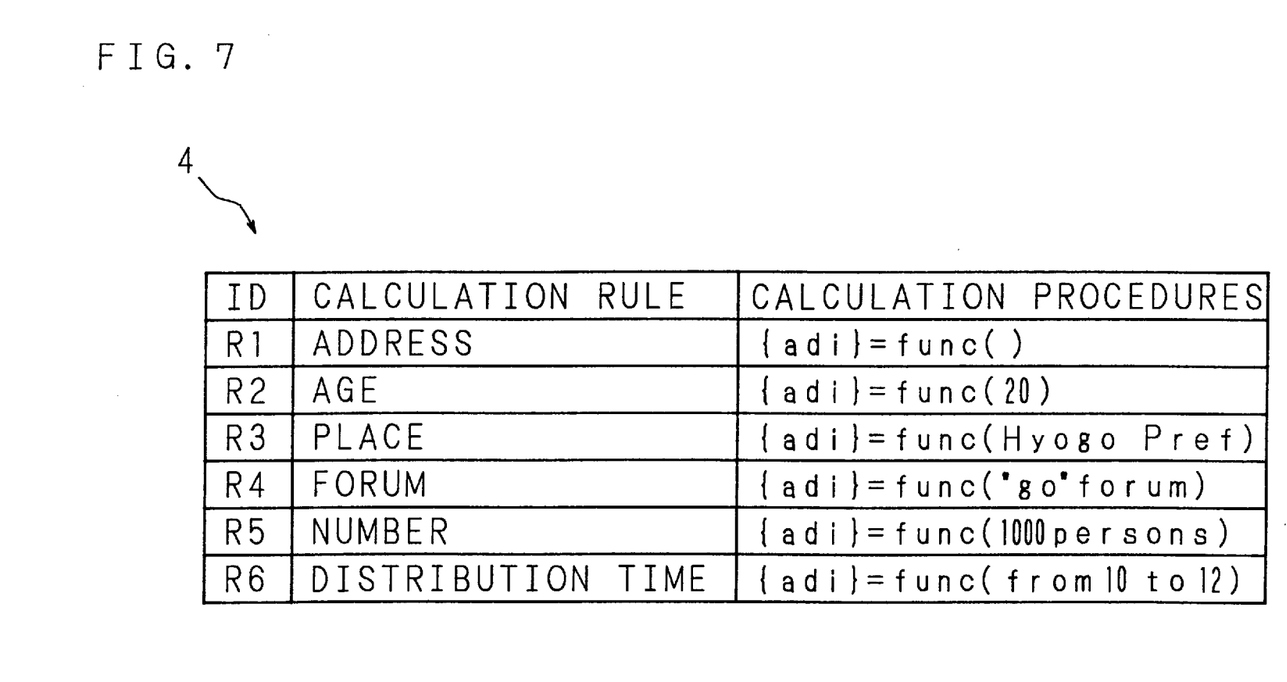
FIG. 7 is a conceptual diagram of calculation rules.

Distribution and calculation rule storage means 4 stores a plurality of calculation rules and the respective calculation procedures, such as "address", "age", "locality", "community", "the number of persons" and "distribution time" which are elements forming retrieval conditions used for narrowing the range of selecting distribution end addresses with IDs (R1, R2, . . . ) appended to respective calculation rules (see FIG. 7).

The distribution end control means 3 retrieves the distribution end calculation rule storage means 4 according to the calculation rule ID received from the distribution end calculation rule designation means 2 to gain the calculation procedures of the calculation rule designated by the user and supplies the designated rule to distribution and calculation means 5.

Figure 6:
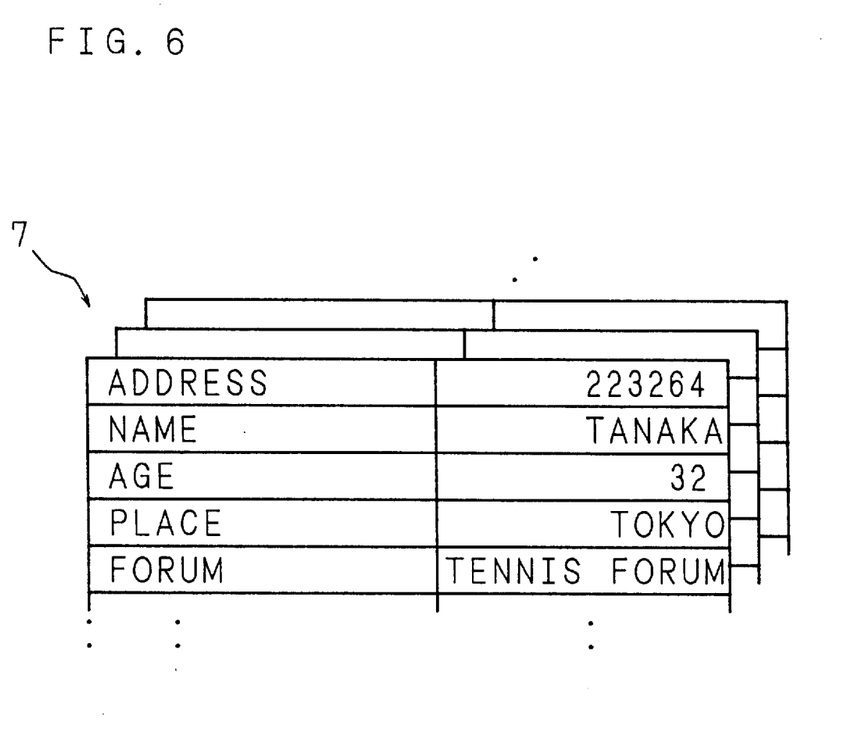
FIG. 6 is a conceptual diagram of attributes of article distribution ends.

Distribution end storage means 7 stores attributes of distribution ends such as address, name, age, locality, community one belongs to, of each distribution end (see FIG. 6).

The distribution end calculation means 5 executes the calculation procedures given from the distribution end control means 3 and calculates n pointers of storage positions of attributes of distribution ends stored in the distribution end storage means 7, according to a number such as a random number generated by number generation means 6. The distribution end calculation means 5 generates a retrieval index for retrieving attributes of distribution ends with numbering a matrix of n pointers of obtaining addresses of unspecified distribution ends (see FIG. 8) by the first to n'th numbers of "adl. adi, . . . , adn", then gives the index to the distribution end control means 3.

In addition, a number generated by the number generation means 6 may be a random number of a uniform distribution, a random number of a probability distribution such as a normal distribution, or a number which functions equally to a random number such as a number which is randomly designated in advance.

The aforementioned distribution end control means 3 retrieves the distribution end storage means 7 on the retrieval index for retrieving attributes of distribution ends generated by the distribution end calculation means 5, gains n addresses of distribution ends from attributes stored in the addresses indicated by n pointers and gives the addresses to distribution control means 1.

The distribution control means 1 controls distribution of an article between a server and a client so that the article is distributed to the distribution end address given from the distribution end control means 3.

(Embodiment 2)

Figure 3:
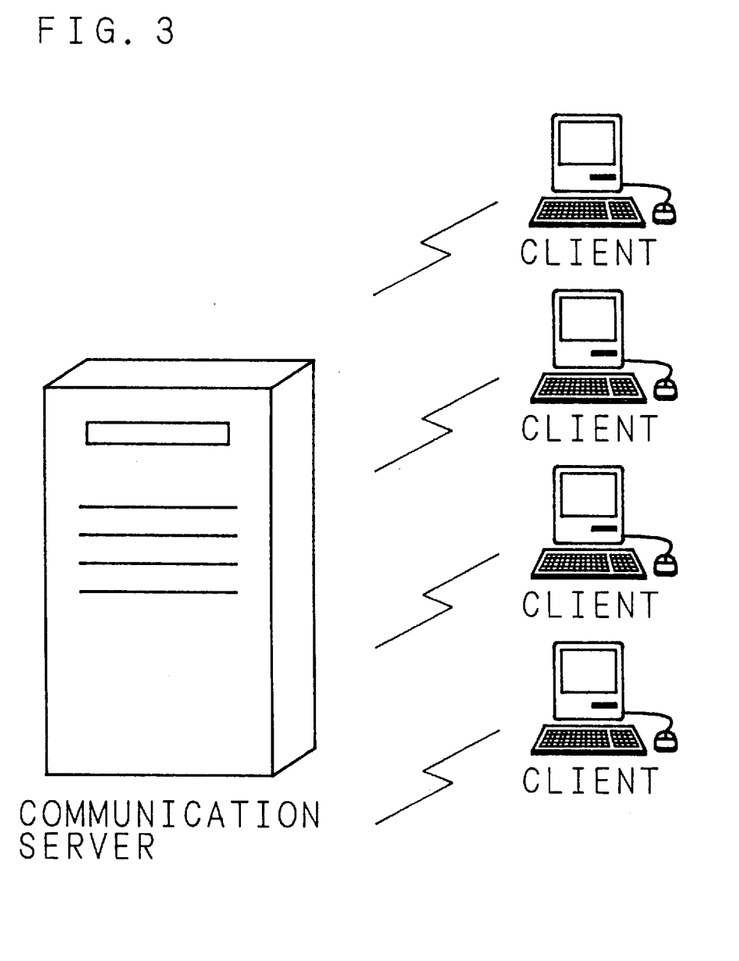
FIG. 3 is a schematic diagram of a second embodiment of the invention.

FIG. 3 is a schematic diagram showing a configuration of a centralized network (personal computer communication or the like) employing the apparatus of the invention.

In the centralized network, a network server provides intranet communication services, and a plurality of client personal computers are connected to the network server.

In such a centralized network, the apparatus of the invention may be built in each of the client personal computers, but may also be built in the server for the purpose of limiting an article distribution to unspecified distribution ends to users who agree the character of the system that an article is distributed to unspecified distribution ends.

Figure 4:
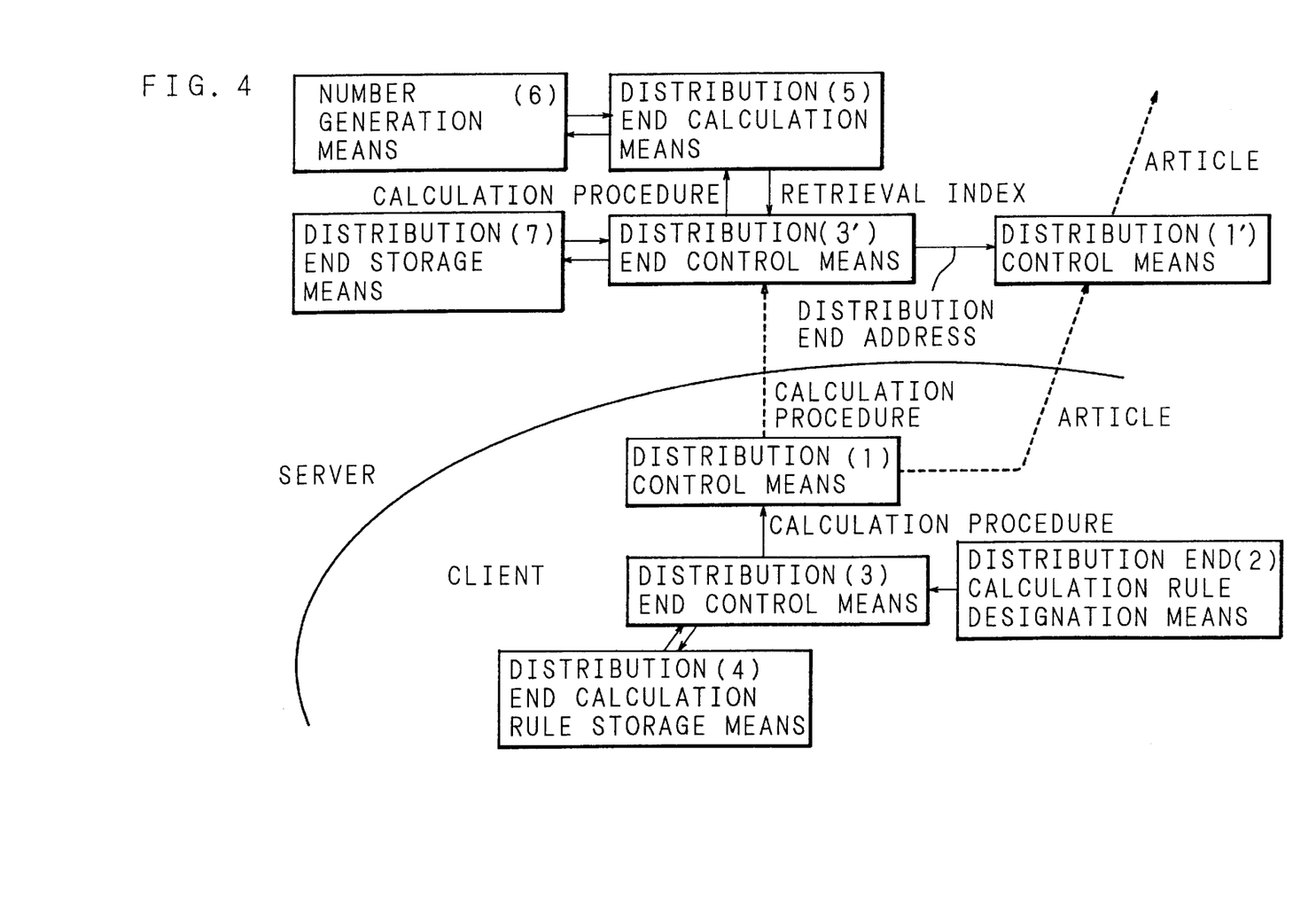
FIG. 4 is a functional block diagram (No. 1) of a second embodiment of the invention.

FIG. 4 is a functional block diagram showing an example of functional arrangement of the apparatus for article distribution end control in such a centralized network as mentioned above. In addition, since a function of each means is basically the same as that of the functional block diagram shown in FIG. 2, the same number is given to the same means and the explanation is omitted.

This embodiment has a configuration where both the server and client share distribution end control. The distribution control means 1, the distribution end calculation rule designation means 2, the distribution end control means 3 and the distribution end calculation rule storage means 4 are disposed on the client side. The distribution control means 1', the distribution end control means 3', the distribution end calculation means 5, number generation means 6 and the distribution end storage means 7 are disposed on the server side.

In this configuration, a user can only designate the calculation rule ID for restricting the range of selection to obtain unspecified distribution end addresses at a personal computer on the user side. Accordingly, for a user among users of the network system, who hates an article being distributed to unspecified distribution ends and being distributed from an unknown user to whom the address has not been noticed yet, it is possible to control this function on the server side so as not to work.

Figure 5:
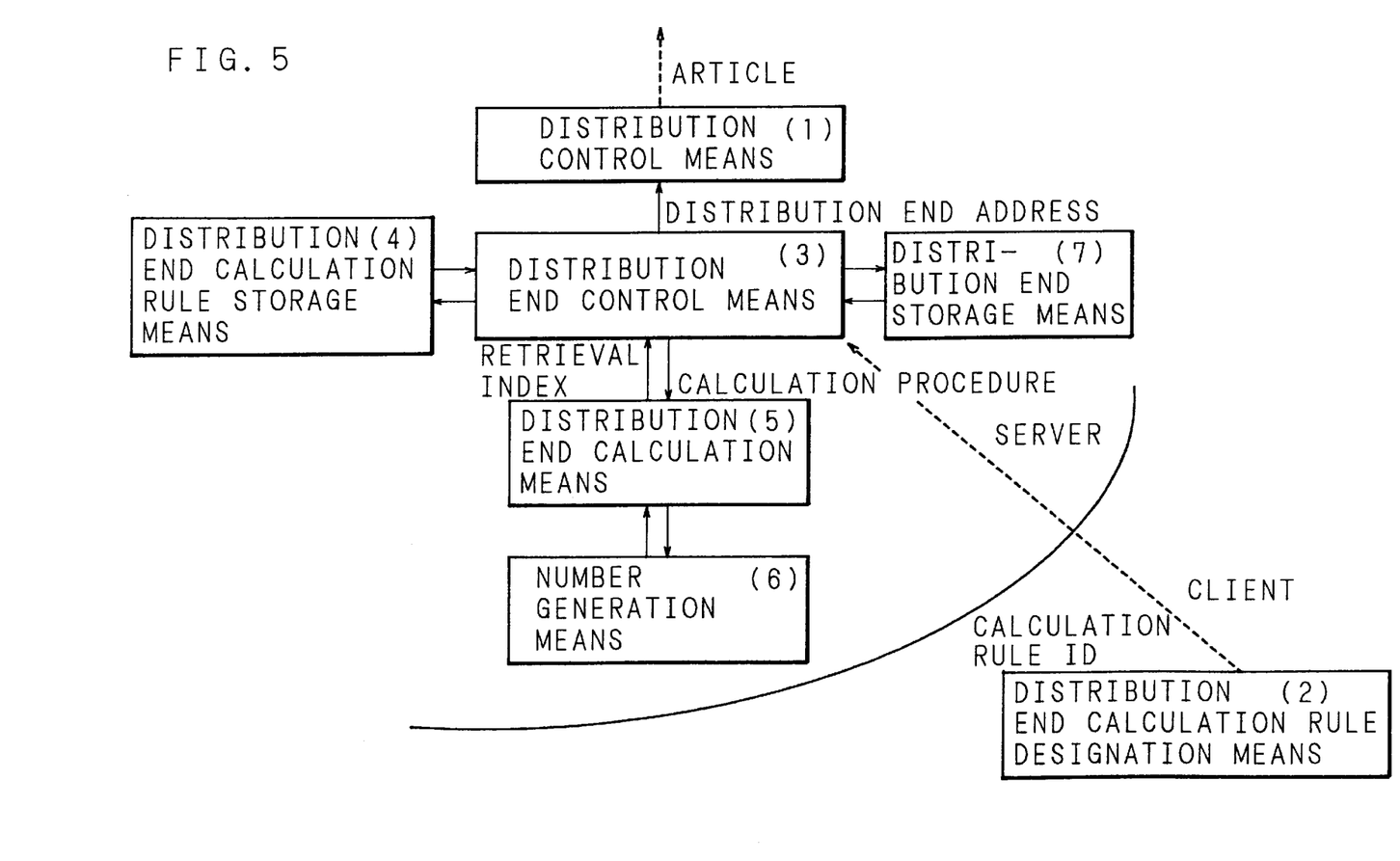
FIG. 5 is a functional block diagram (No. 2) of a second embodiment of the invention.

FIG. 5 is a functional block diagram showing another example of functional arrangement of the apparatus for article distribution end control in the centralized network. In addition, since the function of each means is basically the same as that of the functional block diagram shown in FIG. 2, the same number is given to the same means and the explanation is omitted.

This embodiment has a configuration in which article distribution is controlled on the server side. On the server side, the distribution control means 1, the distribution end control means 3, the distribution end calculation rule storage means 4, the distribution end calculation means 5, the number generation means 6 and the distribution end storage means 7 are disposed. On the client side, only the distribution end calculation rule designation means 2 is disposed.

In this configuration, in the same way as aforementioned, the user can only designate the calculation rule ID for restricting the range of selection to gain unspecified distribution end addresses through a communication line. Accordingly, for the user who hates an article being distributed to unspecified distribution ends and being distributed from an unknown user to whom the address has not been noticed yet, it is possible to control this function on the server side so as not to work.

Next, procedures of distribution end control performed by the apparatus of the invention will be explained referring to the conceptual diagram of an example of distribution end attributes in FIG. 6, the conceptual diagram of an example of calculation rules in FIG. 7, the conceptual diagram of an example of distribution end attribute retrieval index in FIG. 8 and the flowchart in FIG. 9.

As shown in FIG. 6, distribution end attributes such as address, name, age, locality, community one belongs to and so on of each distribution end, are stored in the distribution end storage means 7.

As shown in FIG. 7, a plurality of calculation rules such as "address", "age", "locality", "community", "number of persons", "distribution time" and so on, which are elements to compose retrieval conditions for restricting the range of selection to obtain distribution end addresses, and functions as the respective calculation procedures are stored, and IDs (R1, R2, . . . ) are appended to the respective calculation rules.

In addition, on variable of the functions of the calculation procedures, default values are set respectively, however, a user can also set optional values.

In this embodiment, the default value of the number of function values obtained by the calculation procedures in "n", however, it is possible to set an optional value other than "n", and it is also possible to generate the value by a random number.

When a user designates a distribution end calculation rule ID at a personal computer on the client side (step S1), the distribution end calculation rule designation means 2 accepts the distribution end calculation rule ID designated by the user and transfers the ID to the distribution end control means 3 (step S2).

The distribution end control means 3 refers to the distribution end calculation rule storage means 4 to obtain calculation procedures of the designated calculation rule and transfer the procedures to the distribution end calculation means 5 (step S3).

The distribution end calculation means 5 executes the calculation procedures and generates a retrieval index for attributes of distribution ends which is composed of a matrix of pointers to the distribution end storage means 7 (step S4).

Figure 8:
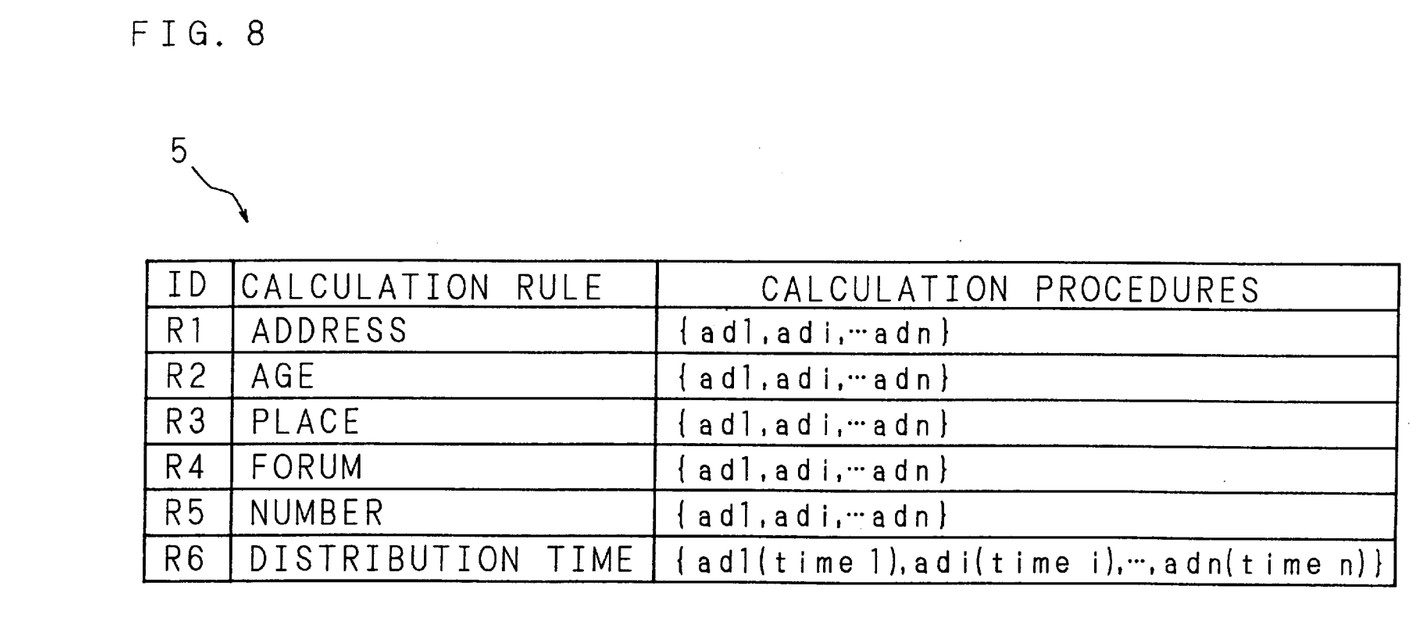
FIG. 8 is a conceptual diagram of attribute retrieval index of article distribution end.
Figure 9:
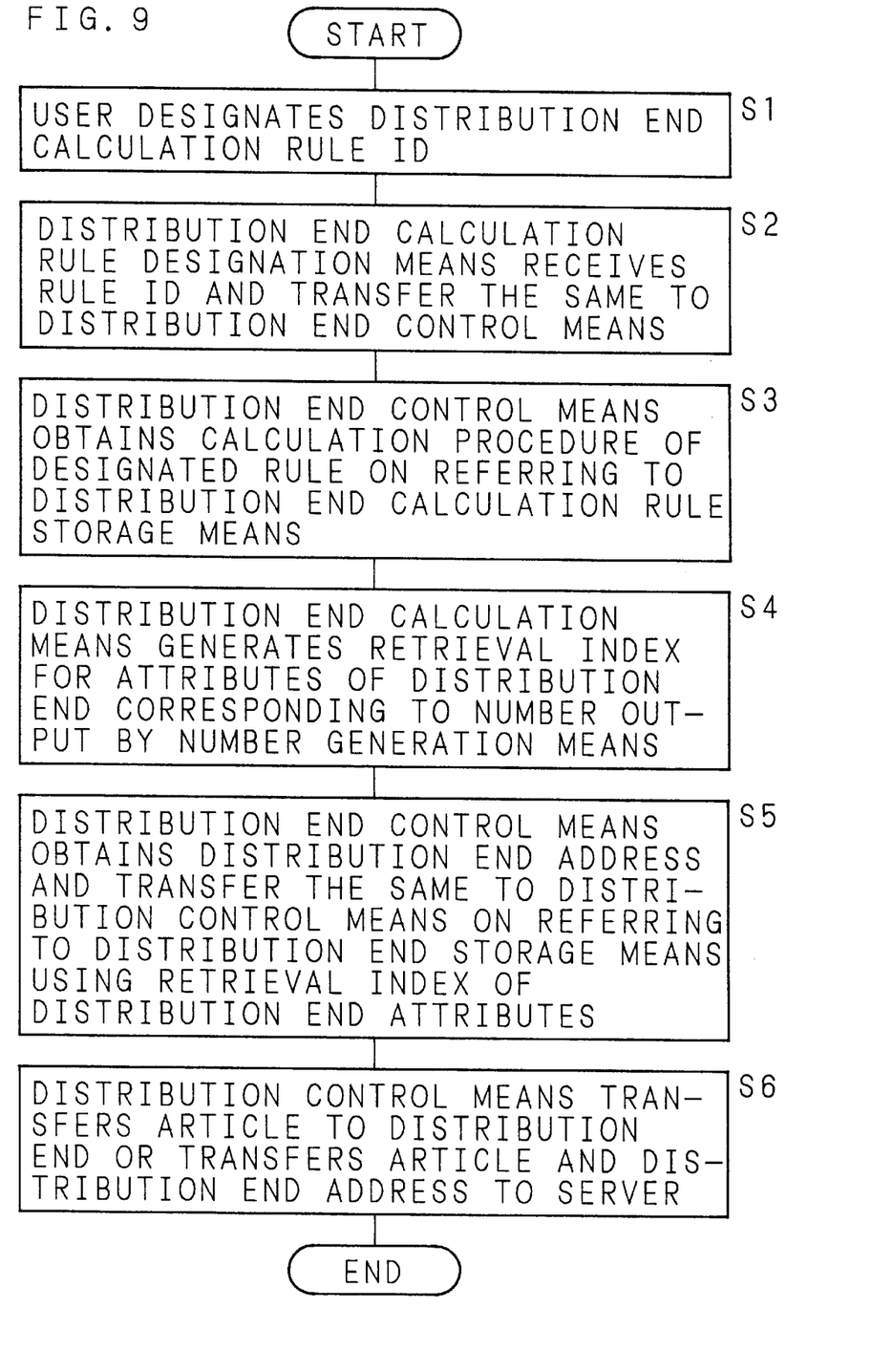
FIG. 9 is a flowchart of a procedure of article distribution end control performed by the apparatus of the invention.

FIG. 8 is a conceptual diagram showing a retrieval index for attributes of distribution ends generated by the distribution end calculation means 5.

As the calculation rule designated by the user, a matrix of pointers "ad1, adi, . . . , and" is generated, which is composed of n random numbers generated by the number generation means 6.

The distribution end control means 3 refers to the distribution end storage means 7 according to the retrieval index for attributes of a distribution end. If "age", for example, is designated as the calculation rule, the distribution end control means 3 obtains distribution end addresses, with the attribute agreeing with a condition of "20 years old" which is the default value if there is no designation by the user, are obtained from among distribution end addresses with attributes designated by the pointers specified by the retrieval index for attributes of distribution ends, and transfers the addresses to the distribution control means 1 (1') (step S5).

The distribution control means 1(1') transmits an article to distribution ends through a server in case of a distributed network, or through a communication line if a server performs a part of or the whole distribution end control in a centralized network. The distribution control means 1(1') transfers the article and distribution end addresses to a server if a client performs the whole distribution end control in a centralized network (step S6).

At this time, conditions of distribution ends, the number of distribution ends and so on may be noticed to the distribution ends of the article.

In addition, such a computer program of distribution end control as aforementioned may be recorded in a detachable recording medium such as a magnetic disk and be loaded into a computer of a server or a client, or may be pre-installed in a computer.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An apparatus for controlling a distribution end of information, comprising:

means for storing an attribute of a distribution end including the distribution end address:

means for generating a number for obtaining a distribution end address to which information is to be distributed selectively, from among distribution ends whose addresses are stored in the distribution end attribute storage means;

means for calculating information which specifies a distribution end whose address is stored in the distribution end storage means, according to the number generated by said number generation means; and means for obtaining an information distribution end address by retrieving the distribution end storage means on the basis of said information calculated by the distribution end specifying information calculation means.

2. The apparatus as set forth in claim 1, wherein said number generation means is the one for generating a random number.

3. The apparatus as set forth in claim 1, wherein said number generation means is the one for generating a number randomly designated in advance.

4. The apparatus as set forth in claim 1, further comprising means for storing plural kinds of calculation rules to restrict the range of selecting a distribution end with an address to be obtained, from among distribution ends whose attributes are stored in said distribution end storage means, wherein said distribution end obtaining means includes means for accepting designation of the kind of said calculation rule, and said distribution end specifying information calculation means includes means for calculating information for specifying a distribution end whose address is stored in the distribution end storage means, according to the number generated by said number generation means, from among distribution ends within the range of selection restricted by the designated calculation rule.

5. The apparatus as set forth in claim 4, wherein said calculation rule is the one for restricting the range of selecting a distribution end with an address to be obtained, by referring to the attribute of a distribution end.

6. The apparatus as set forth in claim 4, wherein said number generation means is the one for generating a random number.

7. The apparatus as set forth in claim 4, wherein said number generation means is the one for generating a number randomly designated in advance.

8. An apparatus for controlling a distribution end which transmits information for selecting an information distribution end to a server, comprising:

means for storing plural kinds of calculation rules to restrict the range of selecting a distribution end with an address to be obtained, from among distribution ends whose attributes are stored in the server who stores an attribute of a distribution end including the distribution end address, generates a number for obtaining a distribution end address to which information is to be distributed selectively, from being the stored distribution ends, calculates information specifying the distribution end, on the basis of the number and obtains an address of the information distribution end by retrieving the stored attributes, on the basis of the calculated information; and means for accepting designation of the kind of said calculation rule.

9. The apparatus as set forth in claim 8, wherein said calculation rule is the one for restricting the range of selecting a distribution end with an address to be obtained on referring to an attribute of a distribution end.

10. The apparatus as set forth in claim 8, wherein said number generation means is the one for generating a random number.

11. The apparatus as set forth in claim 8, wherein said number generation means is the one for generating a number randomly designated in advance.

12. A computer memory product readable by a computer to execute method steps of controlling an information distribution end, comprising:

an attribute of a distribution end including the distribution end address; and a computer program including the method steps of:

generating a number for obtaining a distribution end address to which information is to be distributed selectively, from among distribution ends whose addresses are stored, calculating information specifying a distribution end whose address is stored on the basis of the number; and obtaining an address of an information distribution end by retrieving the distribution end attributes, on the basis of said specifying information being calculated.

13. The memory product as set forth in claim 12, further comprising plural kinds of calculation rules for restricting the range of selecting a distribution end with an address to be obtained, from among distribution ends whose attributes are stored, and the computer program further including the method steps of accepting designation of the kind of said calculation rule and of calculating information for specifying a distribution end whose address is stored, on the basis of said number, from among distribution ends with the range of selection restricted by the designated calculation rule.

14. A computer memory product readable by a computer to execute a method step of controlling an information distribution end, comprising:

plural kinds of calculation rules for restricting the range of selecting a distribution end with an address to be obtained, from among distribution ends whose attributes are stored in a server who stores an attribute of a distribution end including the distribution end address, generates a number for obtaining a distribution end address to which information is to be distributed selectively, from among the stored distribution ends, calculates information for specifying the distribution end, on the basis of the number and obtains an information distribution end address by retrieving the stored attributes, on the basis of the calculated information; and a computer program including the method step of accepting designation of the kind of said calculation rule.

15. A computer program product for use with an apparatus for controlling an information distribution end, comprising:

an attribute of a distribution end including the distribution end address;

a computer usable storage medium having computer readable program code means embodied therein for controlling an information distribution end, said computer readable program code means comprising:

computer readable program code means for causing said computer to generate a number for obtaining a distribution end address to which information is to be distributed selectively, from among distribution ends whose addresses are stored;

computer readable program code means for causing said computer to calculate information for specifying a distribution end whose address is stored, on the basis of the number; and computer readable program code means for causing said computer to obtain an address of an information distribution end by retrieving the stored attributes, on the basis of said information being calculated.

16. The computer program product as set forth in claim 14, further comprising:

plural kinds of calculation rules for restricting the range of selecting a distribution end with an address to be obtained, from among distribution ends whose attributes are stored;

computer readable program code means for causing said computer to accept designation of the kind of said calculation rule; and computer readable program code means for causing said computer to calculate information for specifying a distribution end whose address is stored, on the basis of said number, from among distribution ends within the range of selection restricted by the designated calculation rule.

17. A computer program product for use with an apparatus for controlling an information distribution end, comprising:

plural kinds of calculation rules for restricting the range of selecting a distribution end with an address to be obtained, from among distribution ends whose attributes are stored in a server who stores an attribute of a distribution end including a distribution end address, generates a number for obtaining a distribution end address to which information is to be distributed selectively, from among the stored distribution ends, calculates information for specifying a distribution end, on the basis of the number and obtains information distribution end address by retrieving the stored attributes, on the basis of the calculated information; and a computer usable storage medium having computer readable program code means embodied therein for controlling an information distribution end, said computer readable program code means comprising computer readable program code means for causing said computer to accept designation of the kind of said calculation rule.

* * * * *